US010212597B2

(12) United States Patent
Zhang et al.

(10) Patent No.: US 10,212,597 B2
(45) Date of Patent: Feb. 19, 2019

(54) APPARATUS, SYSTEM AND METHOD FOR SECURE DIRECT COMMUNICATION IN PROXIMITY BASED SERVICES

(71) Applicant: NEC Corporation, Tokyo (JP)

(72) Inventors: Xiaowei Zhang, Tokyo (JP); Anand Raghawa Prasad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 92 days.

(21) Appl. No.: 15/033,278

(22) PCT Filed: Aug. 27, 2014

(86) PCT No.: PCT/JP2014/004393
§ 371 (c)(1),
(2) Date: Apr. 29, 2016

(87) PCT Pub. No.: WO2015/063991
PCT Pub. Date: May 7, 2015

(65) Prior Publication Data
US 2016/0269903 A1    Sep. 15, 2016

(30) Foreign Application Priority Data

Oct. 30, 2013   (JP) ................................ 2013-225200
Oct. 31, 2013   (JP) ................................ 2013-226681

(51) Int. Cl.
*G06F 7/04*       (2006.01)
*H04W 12/08*     (2009.01)
(Continued)

(52) U.S. Cl.
CPC ........... *H04W 12/08* (2013.01); *H04W 12/04* (2013.01); *H04L 63/065* (2013.01); *H04W 76/14* (2018.02)

(58) Field of Classification Search
CPC ............... H04L 2209/80; H04L 63/062; H04L 63/0892; H04L 9/0869; H04L 9/3273
(Continued)

(56) References Cited

U.S. PATENT DOCUMENTS

2004/0073801 A1*  4/2004  Kalogridis ............ G06F 21/305
                                                              713/176
2006/0063594 A1*  3/2006  Benbrahim ............. G07F 17/32
                                                              463/42
(Continued)

FOREIGN PATENT DOCUMENTS

CN    102711105 A    10/2012
JP    2004-328093 A  11/2004
(Continued)

OTHER PUBLICATIONS

International Search Report (ISR) (PCT Form PCT/ISA/210), in PCT/JP2014/004393, dated Nov. 21, 2014.
(Continued)

*Primary Examiner* — Gary S Gracia
(74) *Attorney, Agent, or Firm* — McGinn I.P. Law Group, PLLC.

(57) ABSTRACT

In order for effectively ensuring security for direct communication in ProSe, a ProSe Function acquires from a 3rd party root keys for each of UEs to derive a pair of session keys for securely conducting direct communication with different UEs, and distributes the acquired root keys to each of the UEs. Each of the UEs derives the session keys by using one of the distributed root keys. Moreover, a plurality of UEs, which form a communication system, and are allowed to conduct direct communication with each other when the UEs are in proximity to each other, share public keys of the UEs therebetween through a node which supports the direct communication upon successfully registering the UEs with the node. Each of the UEs verifies at least
(Continued)

a request for the direct communication by using one of the public keys.

13 Claims, 13 Drawing Sheets

(51) Int. Cl.
*H04W 12/04* (2009.01)
*G06F 15/16* (2006.01)
*H04L 29/06* (2006.01)
*H04W 76/14* (2018.01)

(58) Field of Classification Search
USPC ................................................ 726/4; 713/15
See application file for complete search history.

(56) References Cited

U.S. PATENT DOCUMENTS

| | | | |
|---|---|---|---|
| 2006/0150241 A1* | 7/2006 | Huh | H04L 9/32 |
| | | | 726/4 |
| 2006/0168446 A1* | 7/2006 | Ahonen | H04L 9/0822 |
| | | | 713/163 |
| 2006/0236116 A1* | 10/2006 | Patel | H04L 9/0844 |
| | | | 713/183 |
| 2007/0157309 A1* | 7/2007 | Bin | H04L 63/0272 |
| | | | 726/15 |
| 2007/0250582 A1* | 10/2007 | Sidhu | H04L 51/04 |
| | | | 709/206 |
| 2010/0257251 A1 | 10/2010 | Mooring et al. | |
| 2010/0329465 A1 | 12/2010 | Emeott et al. | |
| 2013/0263223 A1* | 10/2013 | Cherian | H04L 9/0869 |
| | | | 726/4 |
| 2013/0290696 A1* | 10/2013 | Broustis | H04L 9/08 |
| | | | 713/150 |
| 2014/0004796 A1* | 1/2014 | Cakulev | H04W 76/14 |
| | | | 455/41.2 |
| 2014/0031028 A1* | 1/2014 | Yamada | H04W 76/14 |
| | | | 455/419 |
| 2014/0066058 A1* | 3/2014 | Yu | H04L 67/16 |
| | | | 455/434 |

FOREIGN PATENT DOCUMENTS

| | | |
|---|---|---|
| JP | 2010-226336 A | 10/2010 |
| JP | 2012-134710 A | 7/2012 |
| WO | WO 2013/118096 A1 | 8/2013 |

OTHER PUBLICATIONS

3GPP TR 33.cde, "Study on security issues to support Proximity Services (Release 12)", V0.2.0, Jul. 2013, pp. 1-21.
3GPP TR 23.703, "Study on architecture enhancements to support Proximity Services (ProSe) (Release 12)", V0.4.1, Jun. 2013, pp. 1-85.
Japanese Office Action dated Aug. 28, 2018 in Japanese Application No. 2016-526370 with an English translation thereof.
Telecom Italia, Solution DX for network controlled ProSe discovery, 3GPP TSG-SA WG2 #99 S2-133809, Sep. 27, 2013.
Chinese Office Action, dated Oct. 8, 2018, in Chinese Application No. 201480060054.5 and English Translation thereof.
3[rd]Generation Partnership Project; Technical Specification Group Services and System Aspect; "Study on architecture enhancements to support Proximity-based Services (ProSe)" (Release 12). 3GPP TR 23.703 VO. 7.1 (Sep. 2013) Oct. 10, 2013.

* cited by examiner

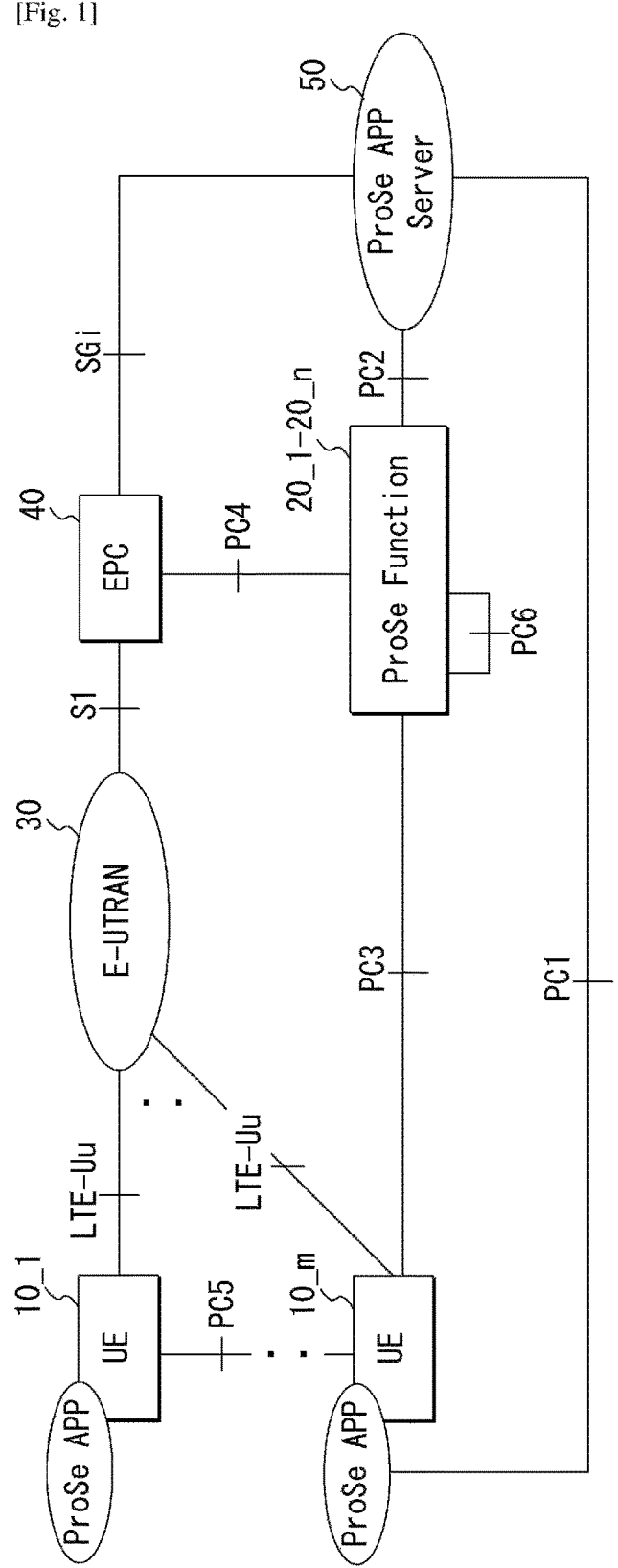
[Fig. 1]

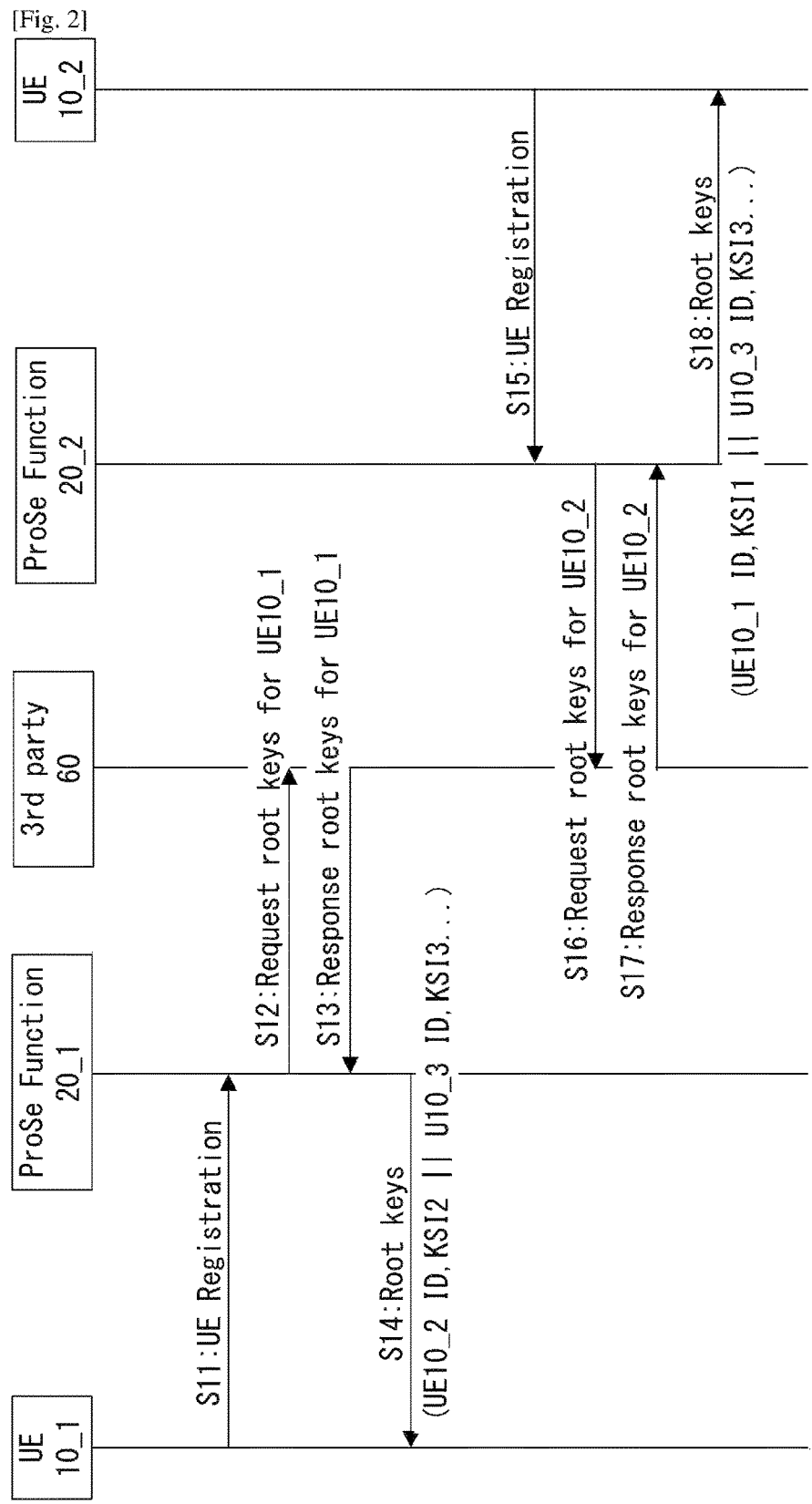
[Fig. 2]

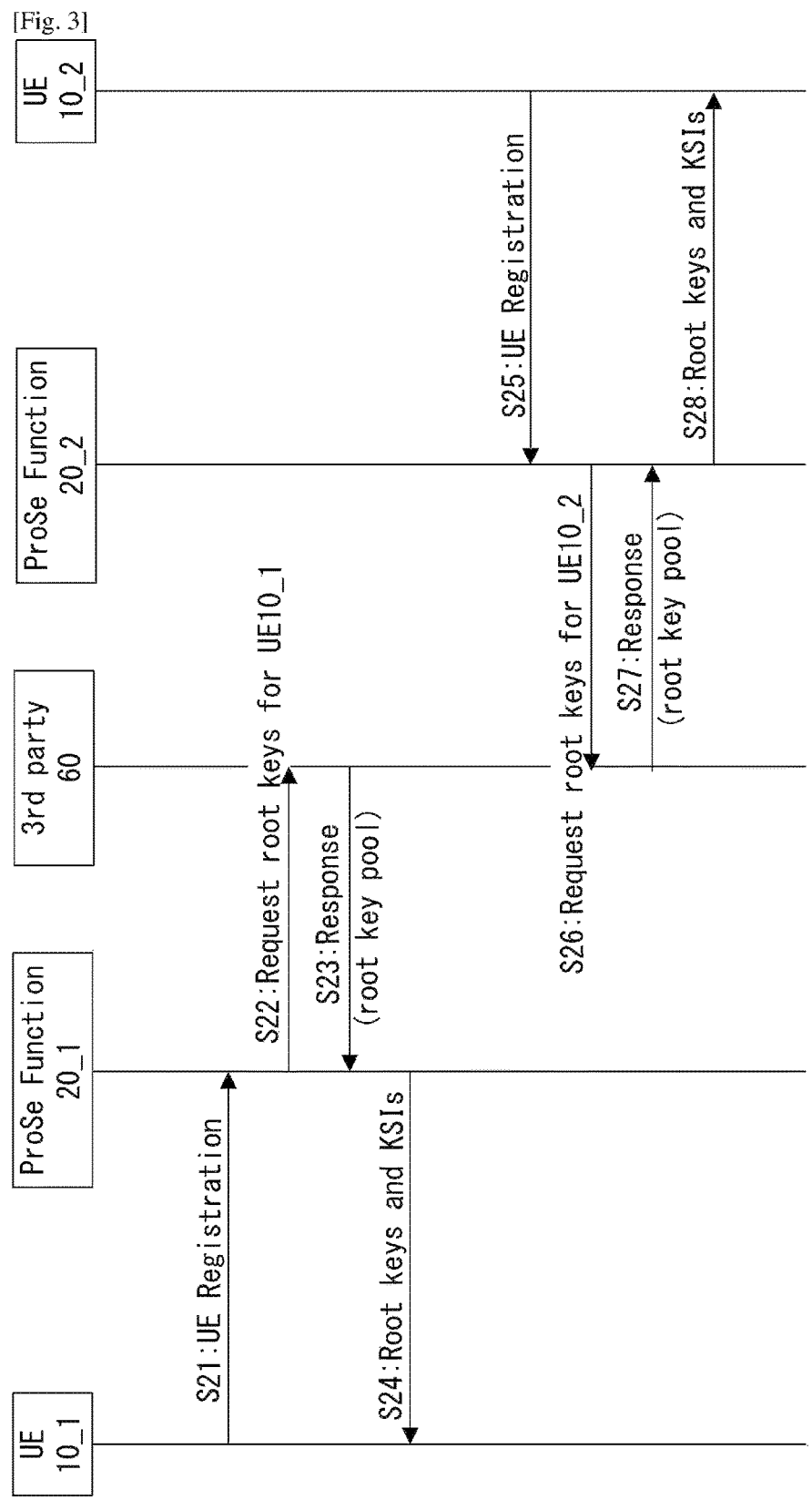
[Fig. 3]

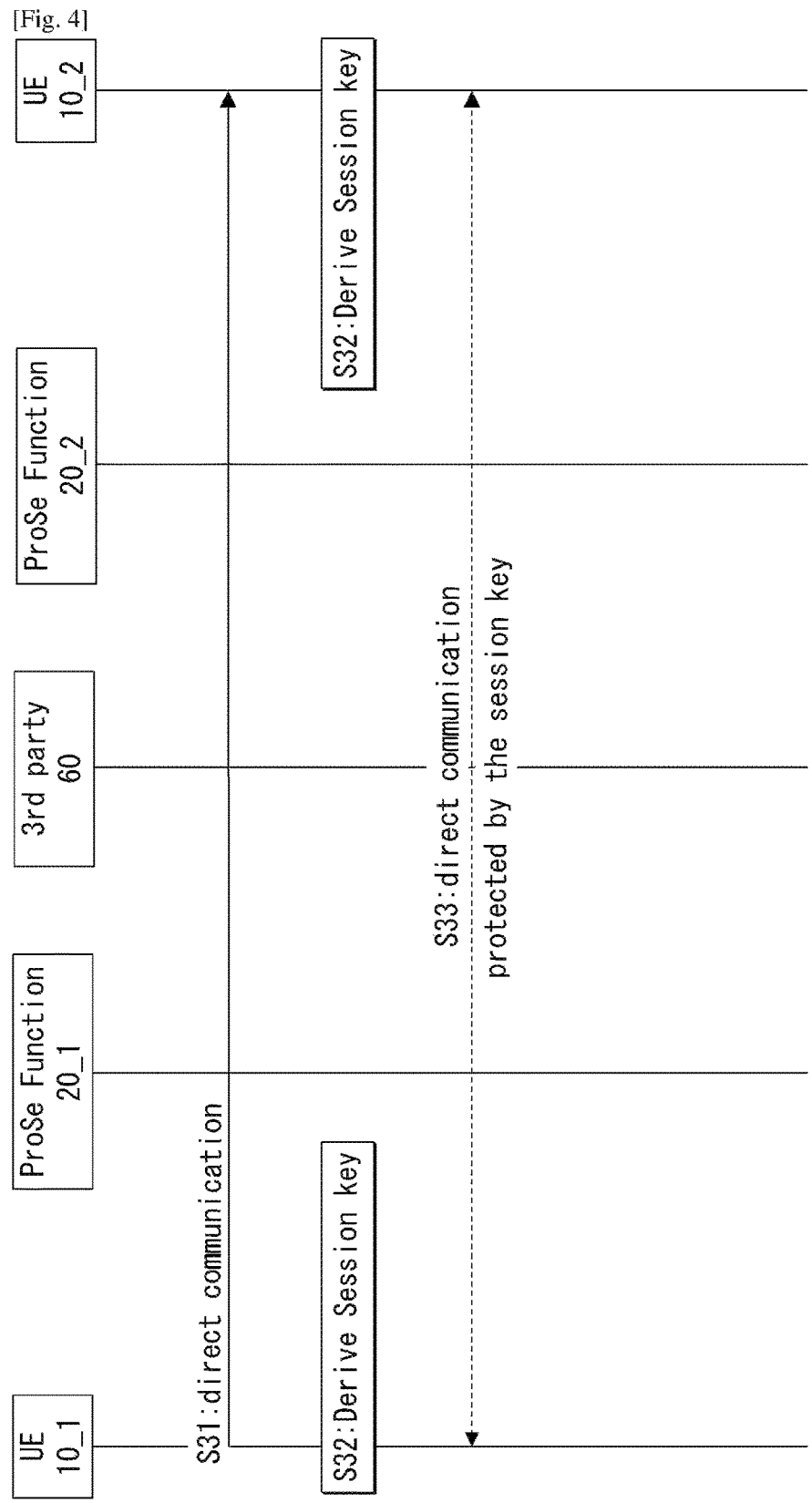

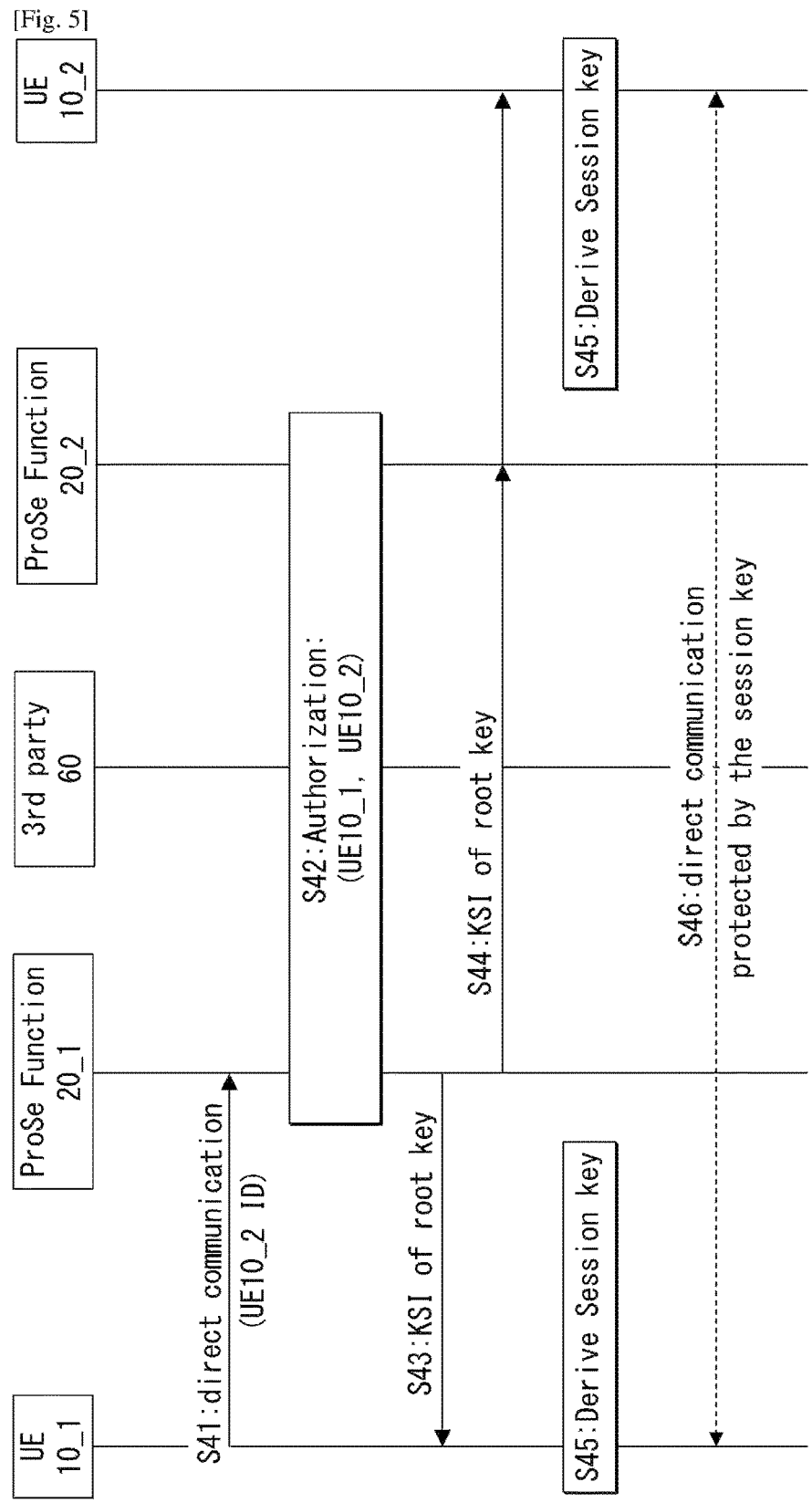
[Fig. 5]

[Fig. 6]
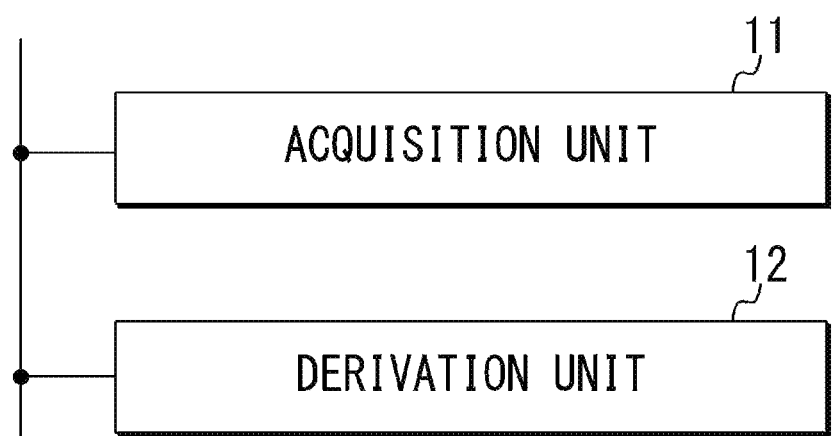
[Fig. 7]
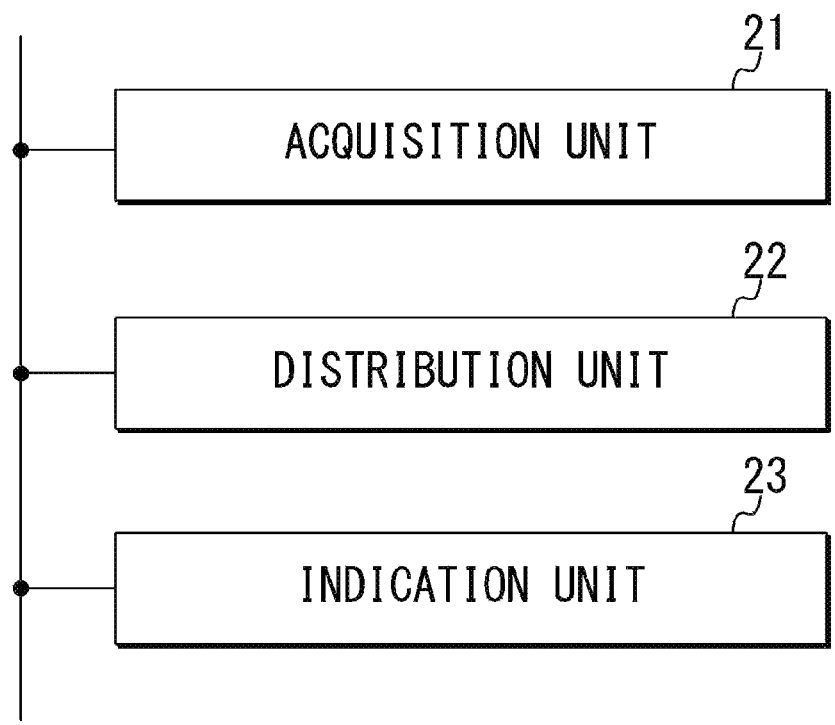

[Fig. 8]
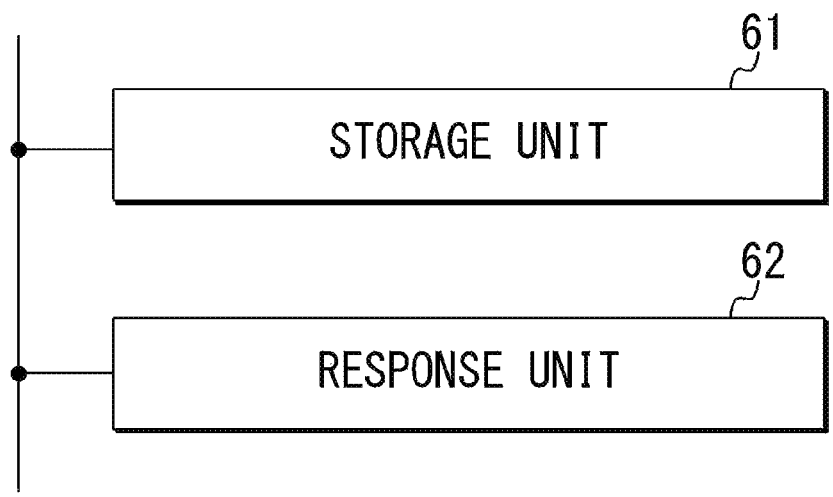

[Fig. 9]
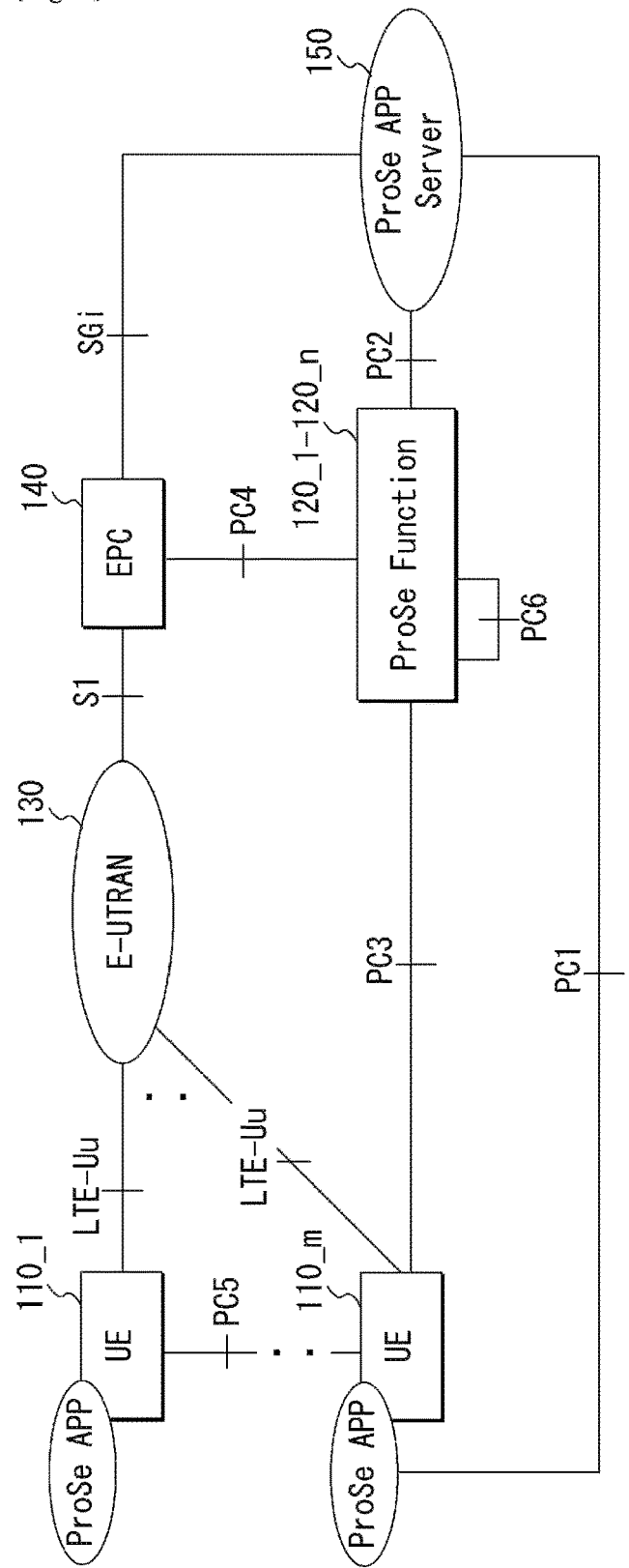

[Fig. 10]
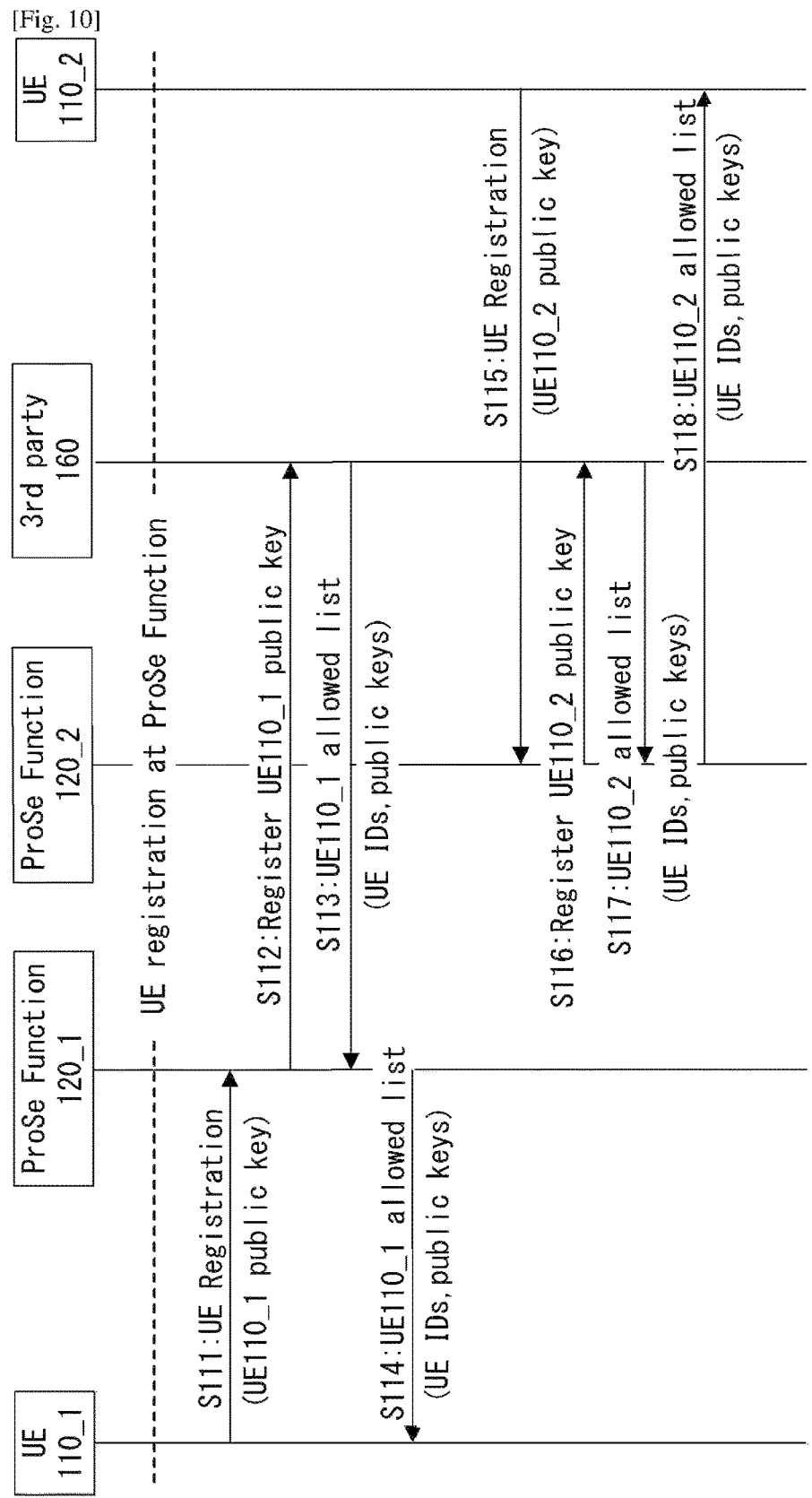

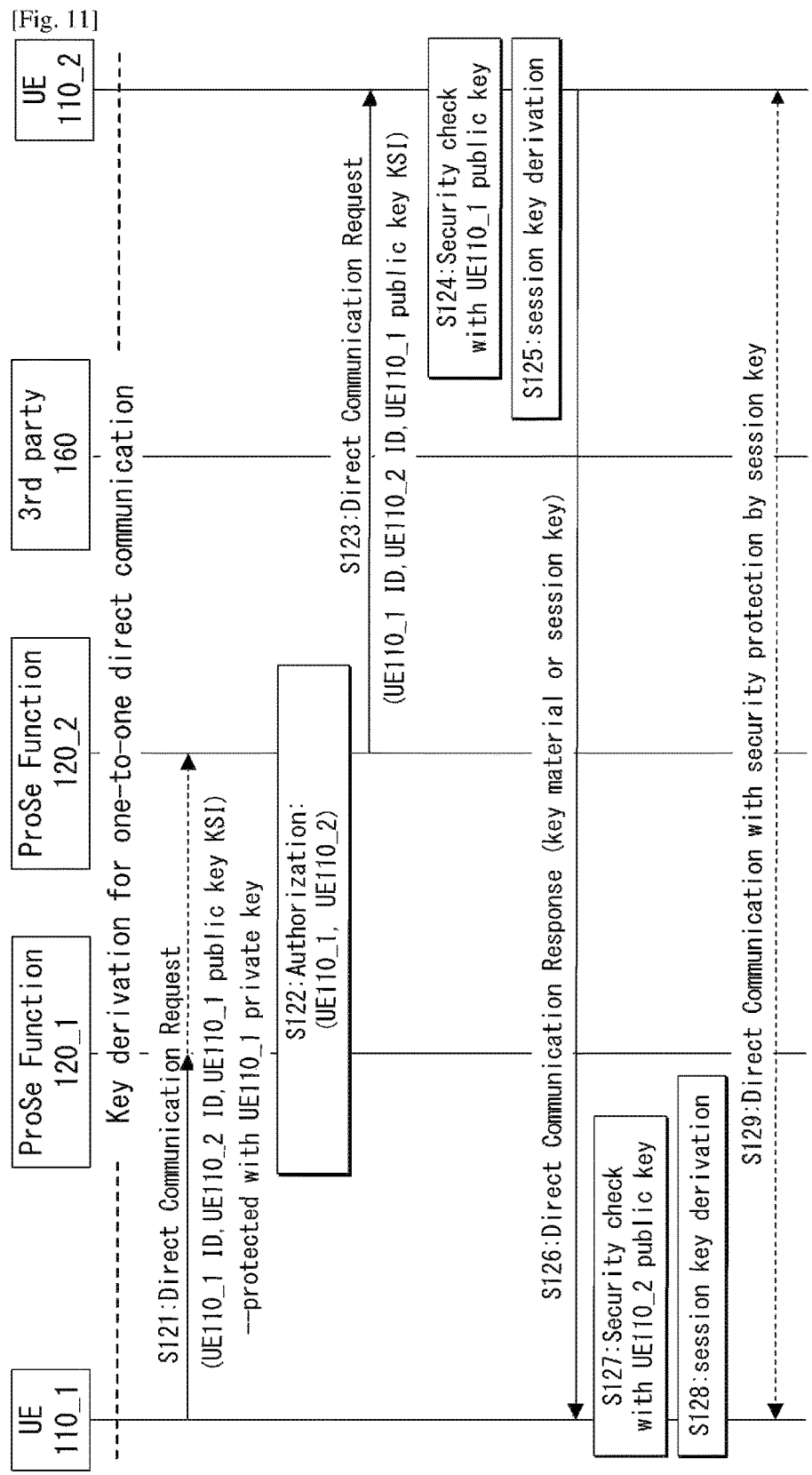

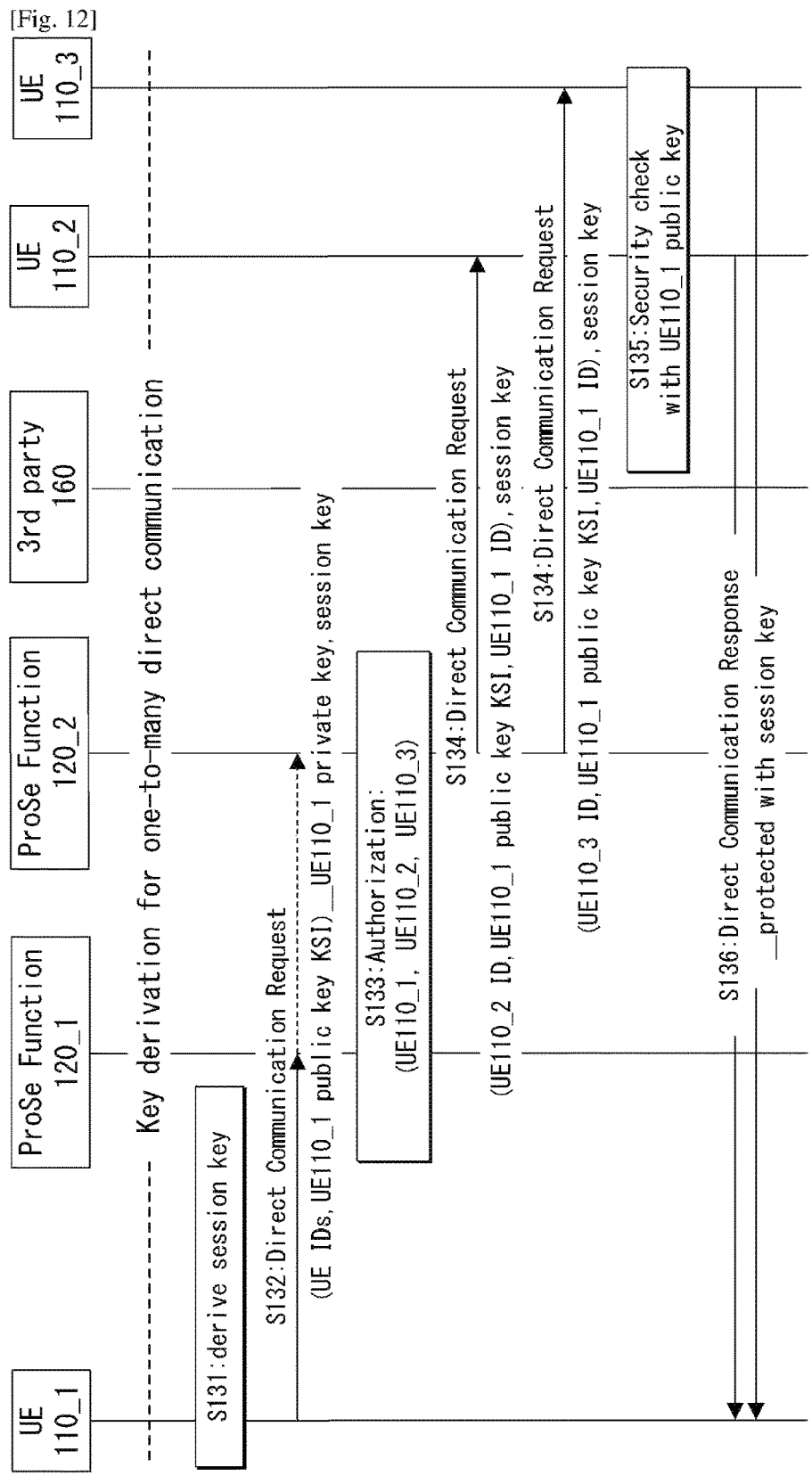

[Fig. 13]
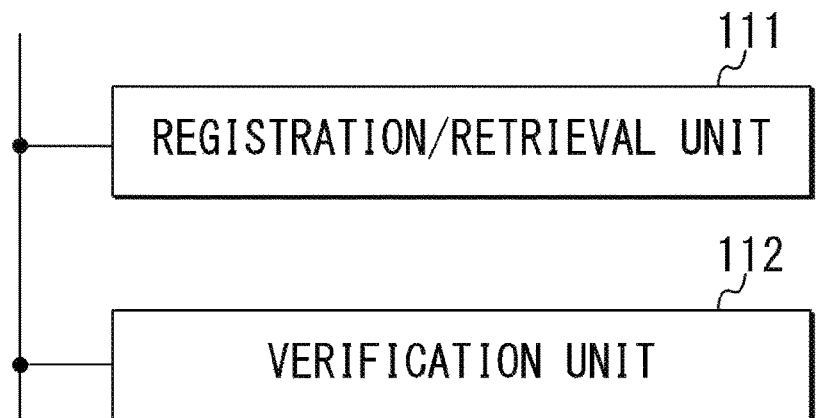
[Fig. 14]
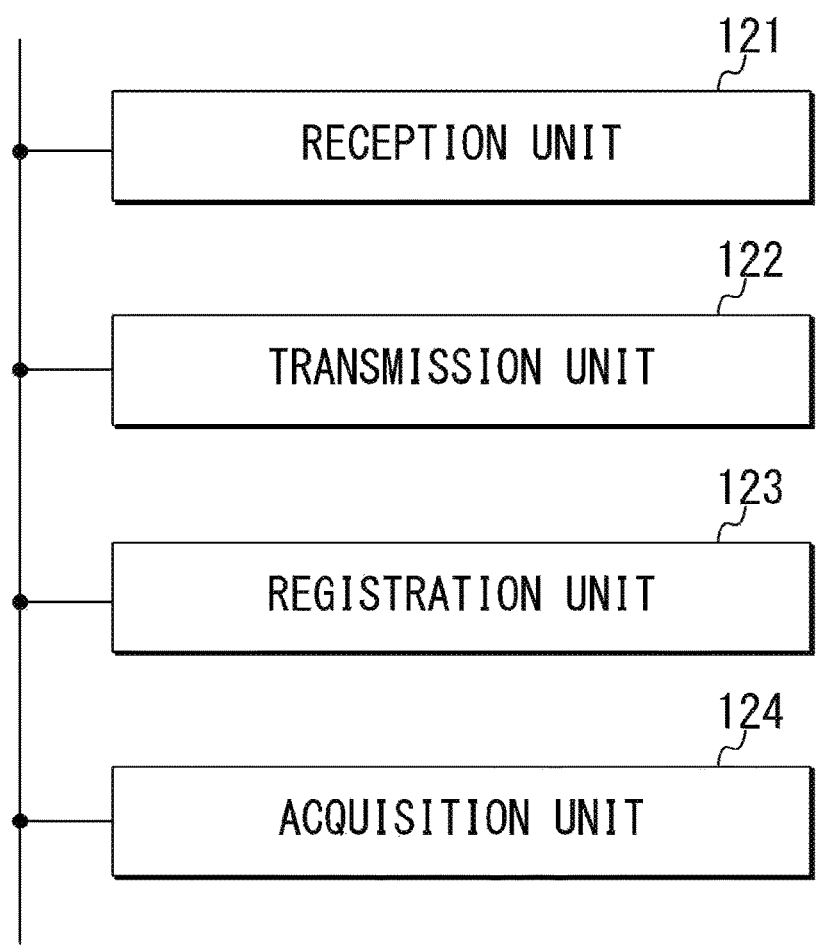

[Fig. 15]
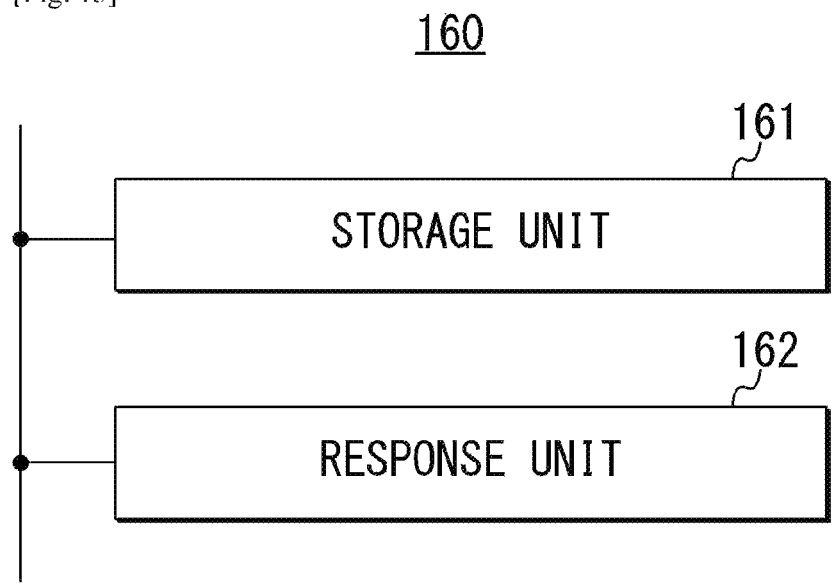

APPARATUS, SYSTEM AND METHOD FOR SECURE DIRECT COMMUNICATION IN PROXIMITY BASED SERVICES

TECHNICAL FIELD

The present invention relates to an apparatus, a system and a method for ProSe (Proximity based Services). In particular, this invention relates to security for direct communication in ProSe, and considers network authorized direct communication. Moreover, this invention relates to proximity direct communication using PKI (Public-Key Infrastructure), and considers not only one-to-one direct communication, but also one-to-many direct communication.

BACKGROUND ART

Direct Communication has been studied by 3GPP (3rd Generation Partnership Project) (see NPLs 1 and 2).

Key issue for direct communication is to secure an interface PC5. How to secure the interface PC5 and how to establish security context (including for example, key derivation, allocation, update) from trust source, with minimal signaling, are important matters.

Note that the interface PC5 is a reference point between UEs (more than one article of User Equipment) such that the UEs can have direct communication thereover. The interface PC5 is used for control and user plane for ProSe discovery, direct communication and UE relay. The UE direct communication can be carried either directly or via LTE-Uu.

CITATION LIST

Non Patent Literature

NPL 1: 3GPP TR 33.cde, "Study on security issues to support Proximity Services (Release 12)", V0.2.0, 2013-07, Clauses 5.4, 5.5 and 6.3, pp. 11, 12 and 13-20

NPL 2: 3GPP TR 23.703, "Study on architecture enhancements to support Proximity Services (ProSe) (Release 12)", V0.4.1, 2013-06, Clauses 5.4, 5.12 and 6.2, pp. 13, 17, 18 and 62-82

SUMMARY OF INVENTION

Technical Problem

However, the inventors of this application have found that the current solution in 3GPP SA3 (Security working group) has the following drawbacks.

1) Impact to MME (Mobility Management Entity): it needs MME being involved in the direct communication procedure including key material allocation.

2) The key allocation procedure happens each time when the UE wants to have direct communication with another UE, which not only creates signaling but also when concurrent one-to-one communication happens. Therefore, the solution is not efficient.

Accordingly, an exemplary object of the present invention is to provide a solution for effectively ensuring security for direct communication in ProSe.

Solution to Problem

In order to achieve the above-mentioned object, a UE according to first exemplary aspect of the present invention includes: acquisition means for acquiring root keys from a node upon successfully registering the UE with the node, the node supporting direct communication between the UE and one or more different UEs that are in proximity to the UE and allowed to communicate with the UE; and derivation means for deriving, by use of one of the root keys, a pair of session keys for securely conducting direct communication with one of the different UEs.

Further, a node according to second exemplary aspect of the present invention supports direct communication between UEs being in proximity to each other and allowed to communicate with each other. This node includes: acquisition means for acquiring root keys from a server upon successfully registering one of the UEs with the node, the root keys being used for said one of the UEs to derive a pair of session keys for securely conducting direct communication with at least another one of the UEs, the server managing the root keys; and distribution means for distributing the root keys to said one of the UEs.

Further, a server according to third exemplary aspect of the present invention includes: storage means for storing root keys for each of UEs to derive a pair of session keys for securely conducting direct communication with at least another one of the UEs, the UEs being in proximity to each other and allowed to communicate with each other; and response means for responding to a request from a node with sending the root keys to the node, the node supporting direct communication between the UEs.

Further, a communication system according to fourth exemplary aspect of the present invention includes: a plurality of UEs that are in proximity to each other and allowed to conduct direct communication with each other; a node that supports the direct communication; and a server that manages root keys for each of UEs to derive a pair of session keys for securely conducting direct communication with at least another one of the UEs. The node acquires the root keys from the server upon successfully registering each of the UEs with the node, and distributes the acquired root keys to each of the UEs. Each of the UEs derives the session keys by using one of the distributed root keys.

Further, a method according to fifth exemplary aspect of the present invention provides a method of controlling operations in a UE. This method includes: acquiring root keys from a node upon successfully registering the UE with the node, the node supporting direct communication between the UE and one or more different UEs that are in proximity to the UE and allowed to communicate with the UE; and deriving, by use of one of the root keys, a pair of session keys for securely conducting direct communication with one of the different UEs.

Further, a method according to sixth exemplary aspect of the present invention provides a method of controlling operations in a node that supports direct communication between UEs being in proximity to each other and allowed to communicate with each other. This method includes: acquiring root keys from a server upon successfully registering one of the UEs with the node, the root keys being used for said one of the UEs to derive a pair of session keys for securely conducting direct communication with at least another one of the UEs, the server managing the root keys; and distributing the root keys to said one of the UEs.

Further, a method according to seventh exemplary aspect of the present invention provides a method of controlling operations in a server. This method includes: storing root keys for each of UEs to derive a pair of session key for securely conducting direct communication with at least another one of the UEs, the UEs being in proximity to each other and allowed to communicate with each other; and responding to a request from a node with sending the root keys to the node, the node supporting direct communication between the UEs.

Further, a UE according to eighth exemplary aspect of the present invention includes: first means for registering a public key of the UE upon successfully registering the UE with a node, and for retrieving public keys of one or more different UEs, the different UEs being allowed to conduct direct communication with the UE when the different UEs are in proximity to the UE, the node supporting the direct communication; and second means for verifying, by using a public key of a first UE among the different UEs, a request from the first UE to conduct direct communication with the UE, the request being protected with a private key of the first UE.

Further, a UE according to ninth exemplary aspect of the present invention includes: first means for registering a public key of the UE upon successfully registering the UE with a node, and for retrieving public keys of one or more different UEs, the different UEs being allowed to conduct direct communication with the UE when the different UEs are in proximity to the UE, the node supporting the direct communication; and second means for verifying, by using a public key of a first UE among the different UEs, a response to a protected first request for requesting the first UE to conduct one-to-one direct communication with the UE, the response being protected with a private key of the first UE.

Further, a node according to tenth exemplary aspect of the present invention supports direct communication between UEs in proximity to each other and allowed to communicate with each other. This node includes: reception means for receiving, upon successfully registering one of the UEs with the node, a public key from said one of the UEs; and transmission means for transmitting, to said one of the UE, public keys of the other UEs as a response to the successful registration. The public keys are used for each of the UEs to verify at least a request for the direct communication.

Further, a server according to eleventh exemplary aspect of the present invention includes: storage means for storing public keys of UEs that are allowed to conduct direct communication with each other when the UEs are in proximity to each other, the public keys being registered by a node that supports the direct communication; and response means for responding to a request from the node with sending the stored public keys to the node. The public keys are used for each of the UEs to verify at least a request for the direct communication.

Further, a communication system according to twelfth exemplary aspect of the present invention includes: a plurality of UEs that are allowed to conduct direct communication with each other when the UEs are in proximity to each other; and a node that supports the direct communication. Each of the UEs shares public keys of the UEs through the node upon successfully registering each of the UEs with the node, and verifies at least a request for the direct communication by using one of the public keys. The node receives each of the public keys from each of the UEs upon registering each of the UEs with the node, and transmits, to each of the UEs, the public keys of different UEs as a response to the successful registration.

Further, a method according to thirteenth exemplary aspect of the present invention provides a method of controlling operations in a UE. This method includes: registering a public key of the UE upon successfully registering the UE with a node, and retrieving public keys of one or more different UEs, the different UEs being allowed to conduct direct communication with the UE when the different UEs are in proximity to the UE, the node supporting the direct communication; and verifying, by using a public key of a first UE among the different UEs, a request from the first UE to conduct direct communication with the UE, the request being protected with a private key of the first UE.

Further, a method according to fourteenth exemplary aspect of the present invention provides a method of controlling operations in a UE. This method includes: registering a public key of the UE upon successfully registering the UE with a node, and retrieving public keys of one or more different UEs, the different UEs being allowed to conduct direct communication with the UE when the different UEs are in proximity to the UE, the node supporting the direct communication; and verifying, by using a public key of a first UE among the different UEs, a response to a protected request for requesting the first UE to conduct one-to-one direct communication with the UE, the response being protected with a private key of the first UE.

Further, a method according to fifteenth exemplary aspect of the present invention provides a method of controlling a node that supports direct communication between UEs in proximity to each other and allowed to communicate with each other. This method including: receiving, upon successfully registering one of the UEs with the node, a public key from said one of the UEs; and transmitting, to said one of the UE, public keys of the other UEs as a response to the successful registration. The public keys are used for each of the UEs to verify at least a request for the direct communication.

Furthermore, a method according to sixteenth exemplary aspect of the present invention provides a method of controlling operations in a server. This method includes: storing public keys of UEs that are allowed to conduct direct communication with each other when the UEs are in proximity to each other, the public keys being registered by a node that supports the direct communication; and responding to a request from the node with sending the stored public keys to the node. The public keys are used for each of the UEs to verify at least a request for the direct communication.

Advantageous Effects of Invention

According to the present invention, it is possible to solve the above-mentioned problems, and thus to provide a solution for effectively ensuring security for direct communication in ProSe.

For example, according to any one of first to seventh exemplary aspects, it is possible to achieve the following advantageous effects.

1) Central root key management, prevent synchronization problem.

2) Reduce root allocation when each time UE needs direct communication service.

BRIEF DESCRIPTION OF DRAWINGS

FIG. 1 is a block diagram showing a configuration example of a communication system according to a first exemplary embodiment of the present invention.

FIG. 2 is a sequence diagram showing an example of operations for allocating root keys in the communication system according to the first exemplary embodiment.

FIG. 3 is a sequence diagram showing another example of operations for allocating root keys in the communication system according to the first exemplary embodiment.

FIG. 4 is a sequence diagram showing an example of operations for deriving a session key in the communication system according to the e first exemplary embodiment.

FIG. 5 is a sequence diagram showing another example of operations for deriving a session key in the communication system according to the first exemplary embodiment.

FIG. 6 is a block diagram showing a configuration example of a UE according to the first exemplary embodiment.

FIG. 7 is a block diagram showing a configuration example of a node according to the first exemplary embodiment.

FIG. 8 is a block diagram showing a configuration example of a server according to the first exemplary embodiment.

FIG. 9 is a block diagram showing a configuration example of a communication system according to a second exemplary embodiment of the present invention.

FIG. 10 is a sequence diagram showing an example of operations for registering UEs in the communication system according to the second exemplary embodiment.

FIG. 11 is a sequence diagram showing an example of operations for deriving a session key for one-to-one direct communication in the communication system according to the second exemplary embodiment.

FIG. 12 is a sequence diagram showing an example of operations for deriving a session key for one-to-many direct communication in the communication system according to the second exemplary embodiment.

FIG. 13 is a block diagram showing a configuration example of a UE according to the second exemplary embodiment.

FIG. 14 is a block diagram showing a configuration example of a node according to the second exemplary embodiment.

FIG. 15 is a block diagram showing a configuration example of a server according to the second exemplary embodiment.

DESCRIPTION OF EMBODIMENTS

Hereinafter, first and second exemplary embodiments of a UE, a node and a server according to the present invention, and a communication system to which these UE, node and server are applied, will be described with the accompany drawings.

First Exemplary Embodiment

FIG. 1 shows a configuration example of a communication system for proximity service. Proximity service provides operator network controlled discovery and communications between UEs that are in proximity, for both commercial/social use and public safety use. It is required that the ProSe service should be provided to UEs with or without network coverage.

As shown in FIG. 1, the communication system according to this exemplary embodiment includes a plurality of UEs 10_1 to 10_m (hereinafter may be collectively referred to by a code 10), one or more ProSe Functions 20_1 to 20_n (hereinafter may be collectively referred to by a code 20), an E-UTRAN (Evolved Universal Terrestrial Radio Access Network) 30, an EPC (Evolved Packet Core) 40, and a ProSe APP (Application) Server 50.

The UE 10 attaches to the EPC 40 thorough the E-UTRAN 30 (i.e., through interfaces LTE-Uu and S1), thereby functioning as a typical UE. Moreover, the UE 10 uses the above-mentioned interface PC5, thereby conducting ProSe communication. Prior to the ProSe communication, the UE 10 is registered with the ProSe Function 20. Note that the UEs 10_1 to 10_m may be registered with the same ProSe Function or mutually different ProSe Functions. Moreover, some of the UEs 10_1 to 10_m may be registered with the same ProSe Function.

The ProSe Function 20 is a node which supports the ProSe communication between the UEs 10_1 to 10_m. The ProSe Function 20 can either be deployed in a certain network node or be an independent node, and may reside in or out of the EPC 40. The ProSe Function 20 communicates with the UE 10 through an interface PC3. Further, the ProSe Function 20 communicates with the EPC 40 through an interface PC4. Furthermore, the ProSe Functions 20_1 to 20_n can communicate with each other through an interface PC6.

Note that the interface PC3 is a reference point between the UE 10 and the ProSe Function 20. The interface PC3 is used to define the interaction between the UE 10 and the ProSe Function 20. An example may be to use for configuration for Prose discovery and communication. Further, the interface PC4 is a reference point between the EPC 40 and the ProSe Function 20. The interface PC4 is used to define the interaction between the EPC 40 and the ProSe Function 20. Possible use cases may be when setting up a one-to-one communication path between the UEs 10_1 to 10_m, or when validating ProSe services (authorization) for session management or mobility management in real time. Furthermore, the interface PC6 is a reference point between the ProSe Functions 20_1 to 20_n. The interface PC6 may be used for functions such as ProSe discovery between users subscribed to different PLMNs (Public Land Mobile Networks).

The E-UTRAN 30 is formed by one or more eNBs (evolved Node Bs) (not shown). The EPC 40 includes, as its network nodes, an MME (Mobility Management Entity) which manages mobility of the UEs 10_1 to 10_m, and the like. The ProSe APP Server 50 can communicate with the EPC 40 through an interface SGi. Moreover, the ProSe APP Server 50 can communicate with the UE 10 through an interface PC1, and can communicate with the ProSe Function 20 through an interface PC2. Note that the interface PC1 is a reference point between ProSe APPs in the UEs 10_1 to 10_m and the ProSe APP Server 50. The interface PC1 is used to define application level signaling requirements. On the other hand, the interface PC2 is a reference point between the ProSe Function 20 and the ProSe APP Server 50. The interface PC2 is used to define the interaction between the ProSe APP Server 50 and ProSe functionality provided by the 3GPP EPS (Evolved Packet System) via the ProSe Function 20. One example may be for application data updates for a ProSe database in the ProSe Function 20. Another example may be data for use by the ProSe App Server 50 in interworking between 3GPP functionality and application data, e.g. name translation. The ProSe APP Server 50 may reside in or out of the EPC 40.

Although the illustration is omitted, the communication system also includes a server operated by a trust third party. In the following description, this server will be sometimes simply referred to as "third (3rd) party" and referred to by a code 60. Typically, the 3rd party 60 manages root keys which will be described later.

Next, operation examples of this exemplary embodiment will be described in detail with reference to FIGS. 2 to 5. Note that configuration examples of the UE 10, the ProSe Function 20 and the 3rd party 60 will be described later with reference to FIGS. 6 and 8.

This exemplary embodiment proposes to use the third party 60 to derive, update and allocate root keys. The ProSe Function 20 supports direct communication and allocates all the root keys to the UE 10 at its registration. Session key are derived at the UE 10 side by using the root key. For example, the session key is a pair of confidentiality and integrity keys for protecting messages directly transferred between the UEs 10_1 to 10_m.

<Operations for Allocating Root Key>

There are proposed two options for root key allocation.

Option 1: Root Key is Related to a Given UE

Root key is derived/allocated at registration. Assume that the ProSe Function 20 has a list of UEs with which the UE 10_1 is allowed to communicate, and that the ProSe Function 20 can ask for all the root keys for the UE 10_1 from the trust 3rd party 60. The 3rd party 60 is responsible for key derivation and allocation. The ProSe Functions 20_1 to 20_n can retrieve root keys from the 3rd party 60 for the UEs 10_1 to 10_m registered to them such that no synchronization is needed between the ProSe Functions 20_1 to 20_n. Each root key is identified by a unique KSI (Key Set Identifier). When direct communication happens, the ProSe Function 20 can indicate to the UEs 10_1 to 10_m which KSI to use, or the UEs 10_1 to 10_m can negotiate about it.

Specifically, as shown in FIG. 2, the UE 10_1 registers at the ProSe Function 20_1 (step S11).

The ProSe Function 20_1 sends Request root keys for the UE 10_1 to the third party 60 which manages the root key (step S12).

The third party 60 responds the ProSe Function 20_1 with the root keys for the UE 10_1. Each root key is related to a unique KSI and a UE with which the UE 10_1 is allowed to have ProSe service (step S13).

The ProSe Function 20_1 distributes the root keys to the UE 10_1, including the UE ID and KSI (step S14).

The same procedure as steps S11 to S14 is performed between the UE 10_2 and the ProSe Function 20_2 (steps S15 to S18).

Option 2: Root Key Pool

Similar to the Option 1, UEs can obtain a key pool, in which each key has a unique KSI to identify it. When the UE 10_1 needs session key for direct communication, network (Prose Function) can indicate which key to use, and also give a same parameter to the UE 10_1 and the UE 10_2 such that they can derive same session keys.

The difference compared to the Option 1 is that here the root keys are not related to any UE. Thus, the ProSe Function 20 needs to ensure that the same root key will not be re-used for different UEs.

Specifically, as shown in FIG. 3, the UE 10_1 registers at the ProSe Function 20_1 (step S21).

The ProSe Function 20_1 sends Request root keys for the UE 10_1 to the third party 60 which manages the root key (step S22).

The third party 60 responds the ProSe Function 20_1 with a root key pool contain a bunch of root keys. Each key is related to a unique KSI (step S23).

The ProSe Function 20_1 distributes the root keys to the UE 10_1 with the KSIs (step S24).

The same procedure as steps S21 to S24 is performed between the UE 10_2 and the ProSe Function 20_2 (steps S25 to S28).

According to this Option 2, it is possible to reduce the amount of signaling to the UE compared with the Option 1. This is because the root keys are not related to any UE, and thus the number of root keys transmitted to the UE can be smaller than that in the Option 1. Moreover, it is also possible to reduce resources in the UE for storing the root keys.

In contrast, according to the Option 1, it is possible to reduce load on the ProSe Function compared with the Option 2. This is because the root keys are allocated to the UEs in a one-to-one manner, and thus the ProSe Function does not need to ensure that the same root key will not be re-used for different UEs.

<Operations for Deriving Session Key>

There are proposed two options for session key derivation and allocation.

Option 1: UE Autonomously Derives Session Key

The UE 10_1 one which initiates direct communication, simply derives a session key, sends it to the ProSe Function, and the ProSe Function will send it to the other UEs.

Alternatively, as shown in FIG. 4, the UE 10_1 send Direct Communication request to the UE 10_2 (step S31).

In the case where the each root key is related to a given UE as shown in FIG. 2, the UEs 10_1 and 10_2 can identify the same root key to be used for deriving a session key, without receiving any instruction from network. Therefore, the UEs 10_1 and 10_2 derive the session key from the identified root key, separately (step S32).

Then, the UE 10_1 and UE 10_2 start direct communication with security protection by using the session key (step S33).

Option 2: UE Derives Session Key in Accordance with KSI Indicated by ProSe Function This option is suitable for the case where the root key pool is allocated as shown in FIG. 3.

As shown in FIG. 5, the UE 10_1 sends Direct Communication request with an ID of the UE 10_2 (UE with which the UE 10_1 wants to have direct communication service) to the ProSe Function 20_1 (step S41).

The ProSe Function 20_1 performs authorization for whether the UE 10_1 is allowed to have direct communication with the UE 10_2 (step S42).

Upon a successful authorization, the ProSe Function 20_1 indicates to the UE 10_1 a root key KSI (step S43).

Further, the ProSe Function 20_1 indicates to the UE 10_2 the root key KSI via the ProSe Function 20_2 (step S44).

The UE 10_1 and the UE 10_2 derives a session key from the root key indicated by the KSI, separately (step S45).

Then, the UE 10_1 and the UE 10_2 start direct communication with security protection by using the session key (step S46).

Next, configuration examples of the UE 10, the ProSe Function (node) 20 and the 3rd party (server) 60 according to this exemplary embodiment will be described with reference to FIGS. 6 to 8.

As show in FIG. 6, the UE 10 includes an acquisition unit 11 and a derivation unit 12. The acquisition unit 11 acquires the root keys from the ProSe Function 20, upon successfully registering the UE 10 with the ProSe Function 20. The derivation unit 12 drives the session keys by using the acquired root key. In the case where each root key is related to a given UE as shown in FIG. 2, the derivation unit 12 uses a root key corresponding to a UE with which the UE 10 desires to conduct direct communication, upon deriving the session keys. On the other hand, in the case where the root key pool is allocated as shown in FIG. 3, the derivation unit 12 uses a root key which is indicated by the KSI received from the ProSe Function 20. Note that these units 11 and 12 are mutually connected with each other through a bus or the like. These units 11 and 12 can be configured by, for example, a transceiver which conducts direct communication with different UEs through the interface PC5, a transceiver which conducts communication with the ProSe Function 20 through the interface PC3, and a controller such as a CPU (Central Processing Unit) which controls these transceivers.

As show in FIG. 7, the ProSe Function 20 includes an acquisition unit 21 and a distribution unit 22. The acquisition unit 21 acquires the root keys from the 3rd party 60, upon successfully registering the UE 10 with the ProSe Function 20. The distribution unit 22 distributes the acquired root keys to the UE 10. In the case where the root key pool is allocated as shown in FIG. 3, the ProSe Function 20 further includes an indication unit 23. The indication unit 23 indicates to the UE 10 the KSI of the root key to be used by the UE 10. Note that these units 21 to 23 are mutually connected with each other through a bus or the like. These units 21 to 23 can be configured by, for example, a transceiver which conducts communication with the UE 10 through the interface PC3, and a controller such as a CPU which controls this transceiver.

As shown in FIG. 8, the 3rd party 60 includes a storage unit 61 and a response unit 62. The storage unit 61 stores the root keys. The response unit 62 responds to the request from the ProSe Function 20 with sending the root keys to the ProSe Function 20. Note that these units 61 and 62 are mutually connected with each other through a bus or the like. These units 61 and 62 can be configured by, for example, a transceiver which conducts communication with the ProSe Function 20, and a controller such as a CPU which controls this transceiver.

Second Exemplary Embodiment

FIG. 9 shows a configuration example of a communication system for proximity service. Proximity service provides operator network controlled discovery and communications between UEs that are in proximity, for both commercial/social use and public safety use. It is required that the ProSe service should be provided to UEs with or without network coverage.

As shown in FIG. 9, the communication system according to this exemplary embodiment includes a plurality of UEs 110_1 to 110_m (hereinafter may be collectively referred to by a code 110), one or more ProSe Functions 120_1 to 120_n (hereinafter may be collectively referred to by a code 120), an E-UTRAN (Evolved Universal Terrestrial Radio Access Network) 130, an EPC (Evolved Packet Core) 140, and a ProSe APP (Application) Server 150.

The UE 110 attaches to the EPC 140 thorough the E-UTRAN 130 (i.e., through interfaces LTE-Uu and S1), thereby functioning as a typical UE. Moreover, the UE 110 uses the above-mentioned interface PC5, thereby conducting ProSe communication. Prior to the ProSe communication, the UE 110 is registered with the ProSe Function 120. Note that the UEs 110_1 to 110_m may be registered with the same ProSe Function or mutually different ProSe Functions. Moreover, some of the UEs 110_1 to 110_m may be registered with the same ProSe Function.

The ProSe Function 120 is a node which supports the ProSe communication between the UEs 110_1 to 110_m. The ProSe Function 120 can be either deployed in a certain network node or be an independent node, and may reside in or out of the EPC 140. The ProSe Function 120 communicates with the UE 110 through an interface PC3. Further, the ProSe Function 120 communicates with the EPC 140 through an interface PC4. Furthermore, the ProSe Functions 120_1 to 120_n can communicate with each other through an interface PC6.

Note that the interface PC3 is a reference point between the UE 110 and the ProSe Function 120. The interface PC3 is used to define the interaction between the UE 110 and the ProSe Function 120. An example may be to use for configuration for Prose discovery and communication. Further, the interface PC4 is a reference point between the EPC 140 and the ProSe Function 120. The interface PC4 is used to define the interaction between the EPC 140 and the ProSe Function 120. Possible use cases may be when setting up a one-to-one communication path between the UEs 110_1 to 110_m, or when validating ProSe services (authorization) for session management or mobility management in real time. Furthermore, the interface PC6 is a reference point between the ProSe Functions 120_1 to 120_n. The interface PC6 may be used for functions such as ProSe discovery between users subscribed to different PLMNs (Public Land Mobile Networks).

The E-UTRAN 130 is formed by one or more eNBs (not shown). The EPC 140 includes, as its network nodes, an MME (Mobility Management Entity) which manages mobility of the UEs 110_1 to 110_m, and the like. The ProSe APP Server 150 can communicate with the EPC 140 through an interface SGi. Moreover, the ProSe APP Server 150 can communicate with the UE 110 through an interface PC1, and can communicate with the ProSe Function 120 through an interface PC2. Note that the interface PC1 is a reference point between ProSe APPs in the UEs 110_1 to 110_m and the ProSe APP Server 150. The interface PC1 is used to define application level signaling requirements. On the other hand, the interface PC2 is a reference point between the ProSe Function 120 and the ProSe APP Server 150. The interface PC2 is used to define the interaction between the ProSe APP Server 150 and ProSe functionality provided by the 3GPP EPS (Evolved Packet System) via the ProSe Function 120. One example may be for application data updates for a ProSe database in the ProSe Function 120. Another example may be data for use by the ProSe App Server 150 in interworking between 3GPP functionality and application data, e.g. name translation. The ProSe APP Server 150 may reside in or out of the EPC 140.

Although the illustration is omitted, the communication system also includes a server operated by a trust third party. In the following description, this server will be sometimes simply referred to as "third (3rd) party" and referred to by a code 160. Typically, the 3rd party 160 manages public keys which will be described later.

Next, operation examples of this exemplary embodiment will be described in detail with reference to FIGS. 10 to 12. Note that configuration examples of the UE 110, the ProSe Function 120 and the 3rd party 160 will be described later with reference to FIGS. 13 to 15.

This exemplary embodiment proposes to use PKI for direct communication. The UEs 110_1 to 110_m can register their public keys at registration procedure and meanwhile obtain other UEs public keys. The ProSe Function 120 ensures that the UE 110 is only provided with the public keys of UEs with which the request UE 110 is allowed to have direct communication. The UEs 110_1 to 110_m use the public key to verify the other end such that they can derive session key to start direct communication. For example, the session key is a pair of confidentiality and integrity keys for protecting messages directly transferred between the UEs 110_1 to 110_m.

The following gives options for key derivation.

1. Use PM for One-to-One Direct Communication:

The UEs 110_1 to 110_m provide their public key at registration and receive other UEs public keys at a successful registration. For example, the UE 110_1 protects Direct Communication Request with its private key. The UE 110_2, which has received the Direct Communication Request, can verify it with UE1's public key. The UE 110_2 can send material for session key derivation to the UE 110_1 and they can derive the same key for protection their direct communication. The UE 110_1 can verify the message sent from the UE 110_2 with UE2's public key, thus they can be mutually authenticated.

The session key derivation can:

1) use a root key which is preliminarily acquired from Prose Function as an input with a key material provided by one of the UE to keep freshness; and 2) also use key exchange scheme (e.g. Diffie-Hellman key exchange scheme) to compute and share a secret key.

Specifically, as shown in FIG. 10, the UE 110_1 registers its public key during registration to the ProSe Function 120_1 (step S111).

The Prose Function 120_1 registers the public key of the UE 110_1 in the third party 160 (step S112).

The third party 160 sends to the Prose Function 120_1 an allowed list. The allowed list contains IDs of UEs with which the UE 110_1 is allowed to have direct communication, and the related public keys of those UEs (step S113).

The Prose Function 120_1 forwards the allowed list to the UE 110_1 (step S114).

The same procedure as steps S111 to S114 is performed for the UE 110_2 (steps S115 to S118).

When the Direction communication starts, as shown in FIG. 11, the UE 110_1 sends Direct Communication Request to the Prose Function 120_1, with the ID of the UE 110_2, a public key KSI of the UE 110_1. The message can be protected with a private key of the UE 110_1. The message is forwarded to the Prose Function 120_2 by the Prose Function 120_1 (step S121).

Note that the use of KSI is suitable for a case where a plurality of public keys are allocated to the UE 110_1. The UE 110_2 can refer to the KSI to identify one of the public keys corresponding to the private key used by the UE 110_1.

The Prose Function 120_1 performs authorization on whether the UE 110_1 can have direct communication service with the UE 110_2, with Prose Function 120_2 support (step S122).

Upon successful authorization, the Prose Function 120_2 forwards the Direct Communication Request to the UE 110_2 (step S123).

Note that if direct communication happens when UE are out of coverage, the Direct Communication Request goes directly from the UE 110_1 to the UE 110_2, and the above step S122 is omitted.

The UE 110_2 can perform integrity check on the message with the public key of the UE 110_1 (step S124).

Upon succeeding in the integrity check, the UE 110_2 derives session key, as described above (step S125).

The UE 110_2 sends Direct Communication Response to the UE 110_1 with materials for session key derivation. Alternatively, the UE 110_2 includes the derived session key in the Direct Communication Response. The message is protected with a private key of the UE 110_2 (step S126).

The UE 110_1 performs integrity check of the message with the public key of the UE 110_2 (step S127).

Upon succeeding in the integrity check, the UE 110_1 derives session key from the material (step S128). This step S128 is skipped if the UE 110_1 has received the session key from the UE 110_2 at step S126. Alternatively, the UE 110_1 extracts the session key from the Direct Communication Response by using the public key of the UE 110_2.

After that, Direct communication starts with security protection by the session key that the UE 110_1 and the UE 110_2 share (step S129).

2. Use PKI for One-to-Many Direct Communication:

The registration procedure is the same with that shown in FIG. 10.

The UE 110_1 protects Direct Communication Request with its private key. Other UEs (e.g. UE 110_2, UE 110_3) can verify it with UE1's public key.

Meanwhile, in this option, the UE 110_1 derives the session key for one-to-many direct communication, and sends the session key to the ProSe Function 120 along with the Direct Communication Request over secured interface PC3. The ProSe Function 120 sends the session key to the UE 110_2 and the UE 110_3. If the UE 110_2 or the UE 110_3 has registered with different ProSe Function, UE 110_1's ProSe Function will forward the session key to UE 110_2/110_3's serving ProSe Function. The session key derivation can use UE 110_1's private key or any LTE (Long Term Evolution) key as input.

Specifically, as shown in FIG. 12, the UE 110_1 derives a session key for direct communication (step S131).

The UE 110_1 sends Direct Communication Request to the Prose Function 120_1, which can be forward to ProSe Functions which serves target UEs (e.g. ProSe Function 20_2, and UEs 110_2 and 110_3). The message contains target UE IDs and UE 110_1's public key KSI, which are protected with UE 110_1's private key. The UE 110_1 also includes the session key in the message (step S132).

The ProSe Functions 120_1 and 120_2 perform authorization on whether the UE 110_1 can have one-to-many direct communication with the target UEs 110_2 and 110_3 (step S133).

The ProSe Function 120_2 forwards the Direct communication Request to the UEs 110_2 and 110_3 (step S134).

Each of the UEs 110_2 and 110_3 performs integrity check on the message with UE 110_1's public key (step S135).

Each of the UEs 110_2 and 110_3 sends the Direct Communication Response to the UE 110_1, protected with the session key it received (step S136). After that, direct communication starts with security protection by the session key that the UEs 110_1 to 110_3 share.

3. Use PM One-to-Many Direction Communication without Using Session Key:

Considering a case where the one-to-many communication is one way only from the UE1 to others, the UE 110_1 simply protects the Direct Communication with its private key to other UEs. The other UEs who are authorized to receive the message from the UE 110_1 can get the UE 110_1'public key and therefore verify that the message is sent from the UE 110_1 and read it. The network (e.g. ProSe Function) should make sure that unauthorized UEs will not get UE 110_1'public key, and the public key should not be sent to other UEs.

Thus, it can prevent non-members from listening to ProSe Group Communication transmissions (as requested in NPL 2, Clause 5.12).

4. Use PM for One-to-Many-Public Key as Input:

The UEs 110_1 to 110_m derive session key, and input for key derivation is: 1) UE 110_1'public key; 2) a key derivation material received from the ProSe Function 120. Requires the UE 110_1'public key and key derivation material are only provided to the authorized UEs.

How can the UE 110_1 have the same session key:

a) the UE 110_1 keeps the public key and receives key derivation material from the ProSe Function 120, such that it can derive the session in the same session key;

b) the ProSe Function 120 can derive the key since it knows both UE 110_1'public key and key derivation material;

c) the ProSe Function 120 provides a key derivation material which UE 110_1 can use it with its private key to derive the same session key.

This requires that key derivation materials to the UE 110_1 and other UEs have some relation.

Next, configuration examples of the UE 110, the ProSe Function (node) 120 and the 3rd party (server) 160 according to this exemplary embodiment will be described with reference to FIGS. 13 to 15.

As show in FIG. 13, the UE 110 includes a registration/retrieval unit 111 and a verification unit 112. The registration/retrieval unit 111 performs the processes shown in FIG. 10 or processes equivalent thereto. The verification unit 112 performs the processes shown in FIGS. 11 and 12, or processes equivalent thereto. Note that these units 111 and 112 are mutually connected with each other through a bus or the like. These units 111 and 112 can be configured by, for example, a transceiver which conducts direct communication with different UEs through the interface PC5, a transceiver which conducts communication with the ProSe Function 120 through the interface PC3, and a controller such as a CPU (Central Processing Unit) which controls these transceivers.

As show in FIG. 14, the ProSe Function 120 includes at least a reception unit 121 and a transmission unit 122. The reception unit 121 performs the processes shown at steps S111 and S115 in FIG. 10, or processes equivalent thereto. The transmission unit 122 performs the processes shown at steps S114 and S118 in FIG. 10, or processes equivalent thereto. Moreover, the ProSe Function 120 can also include a registration unit 123 and an acquisition unit 124. The registration unit 123 performs the processes shown at steps S112 and S116 in FIG. 10, or processes equivalent thereto. The acquisition unit 124 performs the processes shown at steps S113 and S117 in FIG. 10, or equivalent thereto. Note that these units 121 to 124 are mutually connected with each other through a bus or the like. These units 121 to 124 can be configured by, for example, a transceiver which conducts communication with the UE 110 through the interface PC3, a transceiver which conducts communication with the 3rd party 160, and a controller such as a CPU which controls these transceivers.

As shown in FIG. 15, the 3rd party 160 includes a storage unit 161 and a response unit 162. The storage unit 161 stores the root keys registered by the ProSe Function 120. The response unit 162 responds to the request from the ProSe Function 120 with sending the stored public keys to the ProSe Function 120. Note that these units 161 and 162 are mutually connected with each other through a bus or the like. These units 161 and 162 can be configured by, for example, a transceiver which conducts communication with the ProSe Function 120, and a controller such as a CPU which controls this transceiver.

Note that the present invention is not limited to the above-mentioned exemplary embodiments, and it is obvious that various modifications can be made by those of ordinary skill in the art based on the recitation of the claims.

The whole or part of the exemplary embodiments disclosed above can be described as, but not limited to, the following supplementary notes.

(Supplementary Note 1)

A UE (User Equipment) comprising:

acquisition means for acquiring root keys from a node upon successfully registering the UE with the node, the node supporting direct communication between the UE and one or more different UEs that are in proximity to the UE and allowed to communicate with the UE; and derivation means for deriving, by use of one of the root keys, a pair of session keys for securely conducting direct communication with one of the different UEs.

(Supplementary Note 2)

The UE according to Supplementary note 1, wherein the root keys are correlated with the different UEs in a one-to-one manner, wherein the derivation means is configured to use, when deriving the session keys, a root key corresponding to said one of the different UEs.

(Supplementary Note 3)

The UE according to Supplementary note 1, wherein the root keys are a bunch of keys that are not correlated with given UEs, wherein the derivation means is configured to use, when deriving the session keys, a root key indicated by the node.

(Supplementary Note 4)

The UE according to any one of Supplementary notes 1 to 3, wherein the direct communication comprises ProSe (Proximity based Services) communication.

(Supplementary Note 5)

A node that supports direct communication between UEs being in proximity to each other and allowed to communicate with each other, the node comprising:

acquisition means for acquiring root keys from a server upon successfully registering one of the UEs with the node, the root keys being used for said one of the UEs to derive a pair of session keys for securely conducting direct communication with at least another one of the UEs, the server managing the root keys; and distribution means for distributing the root keys to said one of the UEs.

(Supplementary Note 6)

The node according to Supplementary note 5, wherein the root keys are correlated with mutually different UEs in a one-to-one manner.

(Supplementary Note 7)

The node according to Supplementary note 5, further comprising:

indication means for indicating to said one of the UE which root key is to be used for deriving the session keys, when the root keys are a bunch of keys that are not correlated with given UEs.

(Supplementary Note 8)

The node according to any one of Supplementary notes 4 to 7, wherein the direct communication comprises ProSe communication.

(Supplementary Note 9)

A server comprising:

storage means for storing root keys for each of UEs to derive a pair of session keys for securely conducting direct communication with at least another one of the UEs, the UEs being in proximity to each other and allowed to communicate with each other; and response means for responding to a request from a node with sending the root keys to the node, the node supporting direct communication between the UEs.

(Supplementary Note 10)

The server according to Supplementary note 9, wherein the root keys are correlated with mutually different UEs in a one-to-one manner.

(Supplementary Note 11)

The server according to Supplementary note 9, wherein the root keys are a bunch of keys that are not correlated with given UEs.

(Supplementary Note 12)

The server according to any one of Supplementary notes 9 to 11, wherein the direct communication comprises ProSe communication.

(Supplementary Note 13)

A communication system comprising:

a plurality of UEs that are in proximity to each other and allowed to conduct direct communication with each other;

a node that supports the direct communication; and a server that manages root keys for each of UEs to derive a pair of session keys for securely conducting direct communication with at least another one of the UEs, wherein the node acquires the root keys from the server upon successfully registering each of the UEs with the node, and distributes the acquired root keys to each of the UEs, wherein each of the UEs derives the session keys by using one of the distributed root keys.

(Supplementary Note 14)

A method of controlling operations in a UE, the method comprising:

acquiring root keys from a node upon successfully registering the UE with the node, the node supporting direct communication between the UE and one or more different UEs that are allowed to communicate with the UE; and deriving, by use of one of the root keys, a session key for securely conducting direct communication with one of the different UEs.

(Supplementary Note 15)

A method of controlling operations in a node that supports direct communication between UEs being in proximity to each other and allowed to communicate with each other, the method comprising:

acquiring root keys from a server upon successfully registering one of the UEs with the node, the root keys being used for said one of the UEs to derive a pair of session keys for securely conducting direct communication with at least another one of the UEs, the server managing the root keys; and distributing the root keys to said one of the UEs.

(Supplementary Note 16)

A method of controlling operations in a server, the method comprising:

storing root keys for each of UEs to derive a pair of session keys for securely conducting direct communication with at least another one of the UEs, the UEs being in proximity to each other and allowed to communicate with each other; and responding to a request from a node with sending the root keys to the node, the node supporting direct communication between the UEs.

(Supplementary Note 17)

A UE (User Equipment) comprising:

first means for registering a public key of the UE upon successfully registering the UE with a node, and for retrieving public keys of one or more different UEs, the different UEs being allowed to conduct direct communication with the UE when the different UEs are in proximity to the UE, the node supporting the direct communication; and second means for verifying, by using a public key of a first UE among the different UEs, a request from the first UE to conduct direct communication with the UE, the request being protected with a private key of the first UE.

(Supplementary Note 18)

The UE according to Supplementary note 17, wherein the request is for requesting the UE to conduct one-to-one direct communication with the first UE, wherein the second means is configured to:

derive a pair of session keys for securely conducting the one-to-one direct communication, upon succeeding in the verification;

protect a response to the request with a private key of the UE, the response including the session keys or a material for deriving the session keys; and transmit the response to the first UE.

(Supplementary Note 19)

The UE according to Supplementary note 17, wherein the request is for requesting the UE to conduct one-to-many direct communication together with another one or more of the different UEs, and includes a pair of session keys for securely conducting the one-to-many direct communication, wherein the second means is configured to extract the session keys from the request.

(Supplementary Note 20)

The UE according to any one of Supplementary notes 17 to 19, wherein a plurality of public keys are allocated to the UEs, wherein the second means is configured to identify one of the public keys to be used for the verification, based on an indicator included in the request.

(Supplementary Note 21)

A UE (User Equipment) comprising:

first means for registering a public key of the UE upon successfully registering the UE with a node, and for retrieving public keys of one or more different UEs, the different UEs being allowed to conduct direct communication with the UE when the different UEs are in proximity to the UE, the node supporting the direct communication; and second means for verifying, by using a public key of a first UE among the different UEs, a response to a protected first request for requesting the first UE to conduct one-to-one direct communication with the UE, the response being protected with a private key of the first UE.

(Supplementary Note 22)

The UE according to Supplementary note 21, wherein the response includes a pair of first session keys for securely conducting the one-to-one direct communication or a material for deriving the first session keys, wherein the second means is configured to:

extract the first session keys or the material from the response, upon succeeding in the verification; and derive, when the material is extracted, the first session keys from the material.

(Supplementary Note 23)

The UE according to Supplementary note 21 or 22, wherein the second means is configured to:

derive, prior to one-to-many direct communication with two or more of the different UEs, a pair of second session keys for securely conducting the one-to-many direct communication;

include the second session keys in a second request for requesting said two or more of the different UEs to conduct the one-to-many direct communication;

protect the second request with a private key of the UE; and transmit the second request to said two or more of the different UEs through the node.

(Supplementary Note 24)

The UE according to any one of Supplementary notes 21 to 23, wherein a plurality of public keys are allocated to the UE, wherein the second means is configured to include, in the request, an indicator of a public key that corresponds to a private key of the UE used for protecting the request.

(Supplementary Note 25)

A node that supports direct communication between UEs in proximity to each other and allowed to communicate with each other, the node comprising:

reception means for receiving, upon successfully registering one of the UEs with the node, a public key from said one of the UEs; and transmission means for transmitting, to said one of the UE, public keys of the other UEs as a response to the successful registration, wherein the public keys are used for each of the UEs to verify at least a request for the direct communication.

(Supplementary Note 26)

The node according to Supplementary note 25, further comprising:

registration means for registering the public key of said one of the UE with the server; and acquisition means for acquiring the public keys of said other UEs from the server.

(Supplementary Note 27)

A server comprising:

storage means for storing public keys of UEs that are allowed to conduct direct communication with each other when the UEs are in proximity to each other, the public keys being registered by a node that supports the direct communication; and response means for responding to a request from the node with sending the stored public keys to the node, wherein the public keys are used for each of the UEs to verify at least a request for the direct communication.

(Supplementary Note 28)

A communication system comprising:

a plurality of UEs that are allowed to conduct direct communication with each other when the UEs are in proximity to each other; and a node that supports the direct communication, wherein each of the UEs shares public keys of the UEs through the node upon successfully registering each of the UEs with the node, and verifies at least a request for the direct communication by using one of the public keys, wherein the node receives each of the public keys from each of the UEs upon registering each of the UEs with the node, and transmits, to each of the UEs, the public keys of different UEs as a response to the successful registration.

(Supplementary Note 29)

The communication system according to Supplementary note 28, further comprising a server that manages the public keys, wherein the node registers each of the public keys of each of the UEs with the server, and acquires the public keys of the different UEs from the server, wherein the server stores the public keys registered by the node, and responds to a request from the node with sending the stored public keys to the node.

(Supplementary Note 30)

A method of controlling operations in a UE, the method comprising:

registering a public key of the UE upon successfully registering the UE with a node, and retrieving public keys of one or more different UEs, the different UEs being allowed to conduct direct communication with the UE when the different UEs are in proximity to the UE, the node supporting the direct communication; and verifying, by using a public key of a first UE among the different UEs, a request from the first UE to conduct direct communication with the UE, the request being protected with a private key of the first UE.

(Supplementary Note 31)

A method of controlling operations in a UE, the method comprising:

registering a public key of the UE upon successfully registering the UE with a node, and retrieving public keys of one or more different UEs, the different UEs being allowed to conduct direct communication with the UE when the different UEs are in proximity to the UE, the node supporting the direct communication; and verifying, by using a public key of a first UE among the different UEs, a response to a protected request for requesting the first UE to conduct one-to-one direct communication with the UE, the response being protected with a private key of the first UE.

(Supplementary Note 32)

A method of controlling a node that supports direct communication between UEs in proximity to each other and allowed to communicate with each other, the method comprising:

receiving, upon successfully registering one of the UEs with the node, a public key from said one of the UEs; and transmitting, to said one of the UE, public keys of the other UEs as a response to the successful registration, wherein the public keys are used for each of the UEs to verify at least a request for the direct communication.

(Supplementary Note 33)

A method of controlling operations in a server, the method comprising:

storing public keys of UEs that are allowed to conduct direct communication with each other when the UEs are in proximity to each other, the public keys being registered by a node that supports the direct communication; and responding to a request from the node with sending the stored public keys to the node, wherein the public keys are used for each of the UEs to verify at least a request for the direct communication.

This application is based upon and claims the benefit of priority from Japanese patent application No. 2013-225200, filed on Oct. 30, 2013, and Japanese patent application No. 2013-226681, filed on Oct. 31, 2013, the disclosures of which are incorporated herein in their entireties by reference.

REFERENCE SIGNS LIST

**10, 10_1-10_*m*, 110, 110_1-110_*m*** UE
11, 21, 124 ACQUISITION UNIT
12 DERIVATION UNIT
**20, 20_1-20_*n*, 120, 120_1-120_*n*** ProSe Function
22 DISTRIBUTION UNIT
23 INDICATION UNIT
30, 130 E-UTRAN
40, 140 EPC
50, 150 ProSe APP Server
60, 160 3rd party (Server)

61, 161 STORAGE UNIT
62, 162 RESPONSE UNIT
111 REGISTRATION/RETRIEVAL UNIT
112 VERIFICATION UNIT
121 RECEPTION UNIT
122 TRANSMISSION UNIT
123 REGISTRATION UNIT

The invention claimed is:

1. A mobile communication system, comprising:
a central processing unit coupled to a memory storing instructions for executing:
a first and a second UEs (User Equipments) implemented by a transceiver and a controller that support Proximity Services (ProSe);
a first ProSe Function that su arts the ProSe and communicates with the plurality of UEs via a PC3 interface; and
a second ProSe Function that supports the ProSe and communicates with the plurality of UEs via the PC3 interface, wherein the first and second ProSe functions are deployed in different network nodes,
wherein the first UE sends a first message for a discovery to the first ProSe Function via PC3,
wherein the first ProSe Function directly sends a first information on security to the first UE via PC3,
wherein the first UE receives the first information on security from the first ProSe Function which communicated with a ProSe Application Server via a PC2 interface based on the first message for discovery from the first UE,
wherein the second UE sends a second message for the discovery to the second ProSe Function via PC3,
wherein the second ProSe Function directly sends a second information on security to the second UE via PC3,
wherein the second UE receives the second information on security from the second ProSe Function which communicated with the ProSe Application Server via the PC2 interface based on the second message for discovery from the first UE, and
wherein the second UE receives a protected message transmitted from the first UE on a PC5 interface based on the first information and the second information.

2. The mobile communication system according to claim 1, wherein the protected message is protected by a first key based on the first information and a second key based on the second information.

3. The mobile communication system according to claim 1, wherein the ProSe Function includes a node which supports a ProSe communication between the first and second UEs.

4. ProSe (Proximity Services) Functions in a mobile communication system that includes a central processing unit coupled to a memory storing instructions for executing a first UE (User Equipment) and a second UE, implemented by a transceiver and a controller, which supports ProSe and a ProSe Application Server, the ProSe Functions comprising:
a first ProSe Function including a first transmission unit that supports the ProSe and communicates with the first and the second UEs via a PC3 interface and sends a first information on security to the first UE by communicating with the ProSe Application Server via a PC2 interface based on a first message for a discovery from the first UE; and
a second ProSe Function including a second transmission unit that supports the ProSe and communicates with the plurality of UEs via the PC3 interface and sends a second information on security to a second UE which comprises another UE among the plurality of UEs by communicating with the ProSe Application Server via the PC2 interface based on a second message for a discovery from the second UE, wherein the first and second ProSe functions are deployed in different network nodes, and
receiving the first message directly for a discovery from the first UE and directly sending the first information on security to the second UE, and
receiving the second message for the discovery from the second UE and sending a second information on security to the first UE,
wherein the second UE receives a protected message transmitted from the first UE on a PC5 interface based on the first information and the second information.

5. The ProSe Functions according to claim 4, wherein the protected message is protected by a first key based on the first information and a second key based on the second information.

6. A first UE (User Equipment) and a second UE in a mobile communication system that includes a central processing unit coupled to a memory storing instructions for executing ProSe (Proximity Services) Functions including a first ProSe Function that supports the ProSe and communicates with the plurality of UEs via a PC3 interface, a second ProSe Function that supports the ProSe and communicates with the plurality of UEs via the PC3 interface, and a ProSe application server that communicates with the first ProSe function and the second ProSe function via a PC2 interface
wherein the first UE includes a first transceiver that provides the ProSe, and receives a first information on security from the first ProSe Function which discovery from the first UE, and
wherein the second UE includes a second transceiver that provides the ProSe, and receives a second information on security from the second ProSe Function which communicates with the ProSe Application Server based on a second message for the discovery from the second UE, wherein the first and second ProSe functions are deployed in different network nodes,
wherein the first UE sends a direct communication request message to the second UE,
wherein the second transceiver is configured to send a second message for the discovery to the second ProSe Function, and to directly receive a second information on security from the second ProSe Function, and
wherein the second UE receives a protected message transmitted from the first UE on a PC5 interface based on the first information and the second information.

7. The first and second UEs according to claim 6, wherein the protected message is protected by a first key based on the first information and a second key based on the second information.

8. A communication method of a mobile communication system including a first UE (User Equipment) and a second UE implemented by a transceiver and a controller that support Proximity Services (ProSe), a first ProSe Function that supports the ProSe and communicates with the plurality of UEs via a PC3 interface and a second ProSe Function that supports the ProSe and communicates with the plurality of UEs via the PC3 interface, wherein the first and second ProSe functions are deployed in different network nodes, the communication method comprising:
sending, by the first UE, a first message for a discovery to the first ProSe Function via PC3;

sending, directly by the first ProSe Function, a first information on security to the first UE via PC3, wherein the first UE receives the first information on security from the first ProSe Function which communicated with a ProSe Application Server via a PC2 interface based on the first message for discovery from the first UE;

sending, by the second UE, a second message for the discovery to the second ProSe Function via PC3;

sending, by the second ProSe Function, a second information on security to the second UE directly via PC3, wherein the second UE receives the second information on security from the second ProSe Function which communicated with the ProSe Application Server via a PC2 interface based on the second message for discovery from the first UE; and receiving, by the second UE, a protected message transmitted from the first UE on a PC5 interface based on the first information and the second information.

9. The communication method according to claim 8, wherein the protected message is protected by a first key based on the first information and a second key based on the second information.

10. A communication method of ProSe Functions (Proximity Services) in a mobile communication system that includes a first UE (User Equipment) and a second UE, implemented by a transceiver and a controller, which supports the ProSe and a ProSe Application Server, the ProSe Functions comprising:

a first ProSe Function including a first transmission unit that supports the ProSe and communicates with the first and the second UEs via a PC3 interface and sends a first information on security to the first UE by communicating with the ProSe Application Server via a PC2 interface based on a first message for a discovery from the first UE; and a second ProSe Function including a second transmission unit that supports the ProSe and communicates with the plurality of UEs via the PC3 interface and sends a second information on security to a second UE which comprises another UE among the plurality of UEs by communicating with the ProSe Application Server via a PC2 interface based on a second message for a discovery from the second UE, wherein the first and second ProSe functions are deployed in different network nodes, the communication method comprising:

receiving the first message directly for a discovery from the first UE;

sending the first information on security to the second UE directly;

receiving the second message for the discovery from the second UE; and sending a second information on security to the second UE directly, wherein the second UE receives a protected message transmitted from the first UE on a PC5 interface based on the first information and the second information.

11. The communication method according to claim 10, wherein the protected message is protected by a first key based on the first information and a second key based on the second information.

12. A communication method of a first UE (User Equipment) and a second UE in a mobile communication system that includes ProSe (Proximity Services) Functions including a first ProSe Function that supports the ProSe and communicates with the plurality of UEs via a PC3 interface, a second ProSe Function that supports the ProSe and communicates with the plurality of UEs via the PC3 interface, and a ProSe application server that communicates with the first ProSe function and the second ProSe function via a PC2 interface, wherein the first UE includes a first transceiver that provides the ProSe, and receives a first information on security from the first ProSe Function which communicates with the ProSe Application Server based on a first mesa e for a discovery from the first UE, and wherein the second UE includes a second transceiver that provides the ProSe and receives a second information on security from the second ProSe Function which communicates with the ProSe Application Server based on a second message for the discovery from the second UE, wherein the first and second ProSe functions are deployed in different network nodes, the communication method comprising:

sending, by the first UE, a direct communication request message to the second UE;

sending, by the second transceiver, a second message for the discovery to the second ProSe Function, and directly receiving a second information on security from the second ProSe Function; and receiving, by the second UE, a protected message transmitted from the first UE on a PC5 interface based on the first information and the second information.

13. The communication method according to claim 12, wherein the protected message is protected by a first key based on the first information and a second key based on the second information.

* * * * *